(No Model.) 2 Sheets—Sheet 1.

H. D. PERKY.
MACHINE FOR REDUCTION AND PREPARATION OF CEREALS FOR FOOD.

No. 533,555. Patented Feb. 5, 1895.

WITNESSES
Geo. M. Anderson
Philip C. Mass

INVENTOR
H. D. Perky
by C. W. Anderson
his Attorney (No Model.) 2 Sheets—Sheet 2.
H. D. PERKY.
MACHINE FOR REDUCTION AND PREPARATION OF CEREALS FOR FOOD.
No. 533,555. Patented Feb. 5, 1895.
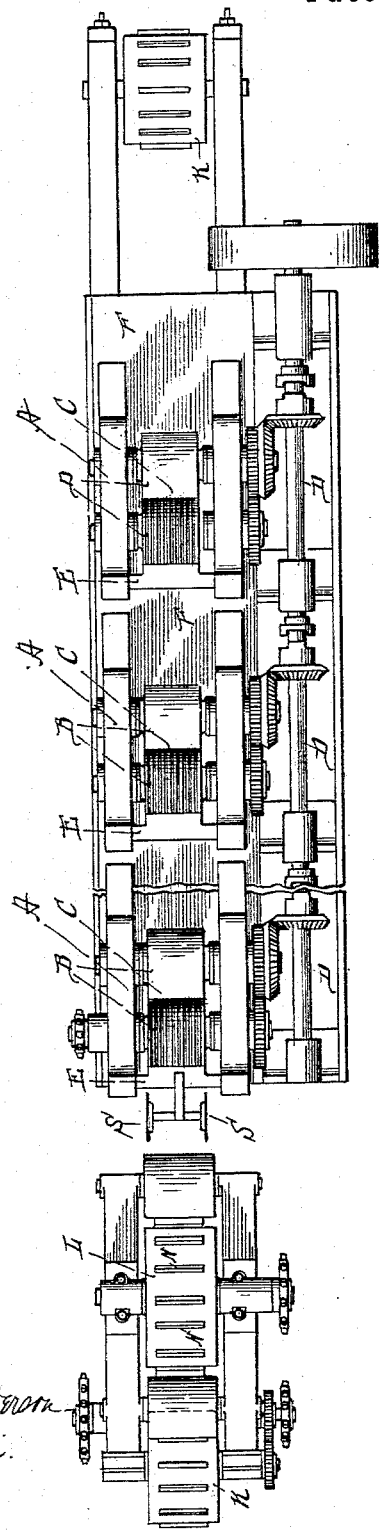
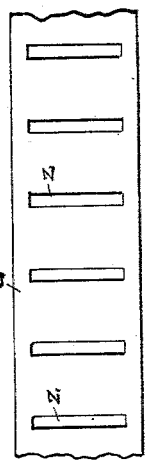
Fig. 6.
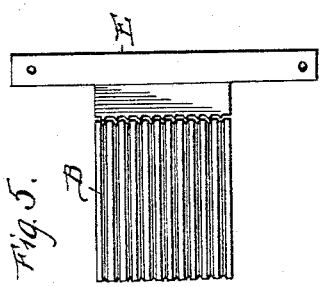
Fig. 5.
Fig. 2.
WITNESSES
Geo. M. Anderson
Philip C. Masi
INVENTOR
H. D. Perky.
By E. W. Anderson,
his Attorney
THE NORRIS PETERS CO., PHOTO-LITHO., WASHINGTON, D. C.

UNITED STATES PATENT OFFICE.

HENRY D. PERKY, OF DENVER, COLORADO, ASSIGNOR TO THE CEREAL MACHINE COMPANY, OF SAME PLACE.

MACHINE FOR REDUCTION AND PREPARATION OF CEREALS FOR FOOD.

SPECIFICATION forming part of Letters Patent No. 533,555, dated February 5, 1895.

Application filed May 4, 1894. Serial No. 510,075. (No model.)

*To all whom it may concern:*

Be it known that I, HENRY D. PERKY, a citizen of the United States, residing at Denver, in the county of Arapahoe and State of Colorado, have invented new and useful Improvements in Machines for the Reduction and Preparation of Cereals for Food; and I do declare the following to be a full, clear, and exact description of the invention, such as will enable others skilled in the art to which it appertains to make and use the same, reference being had to the accompanying drawings, forming a part of this specification, and to the letters of reference marked thereon.

Figure 1:
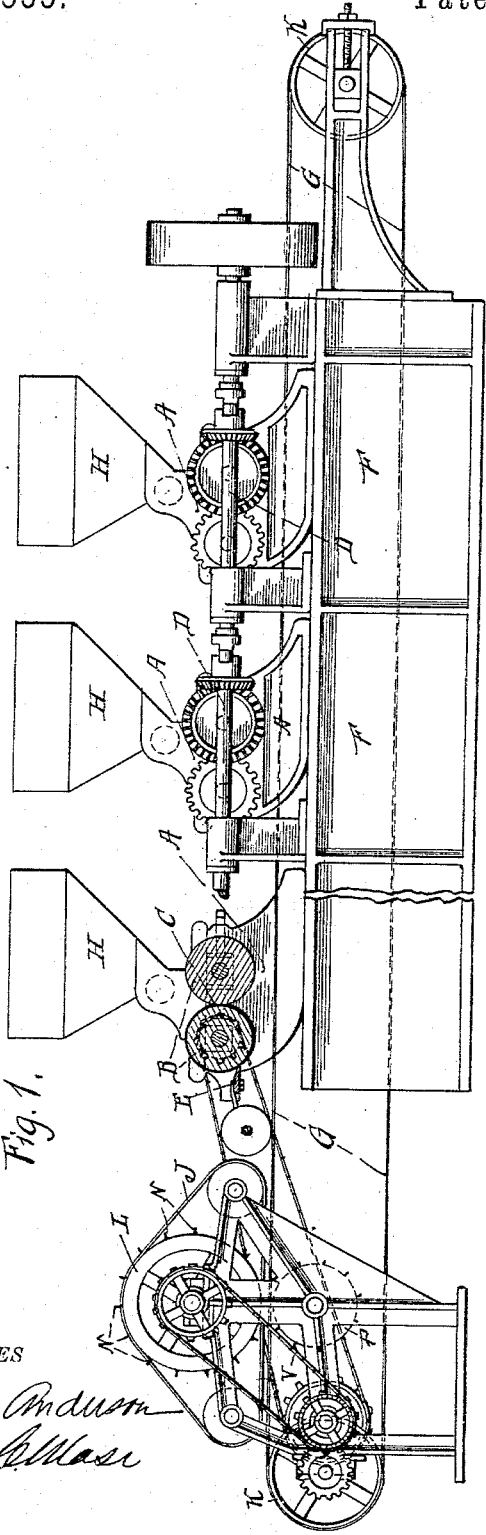
Figure 4:
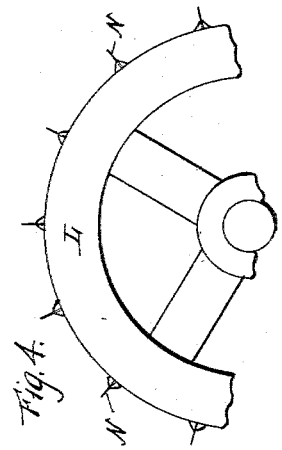
Figure 3:
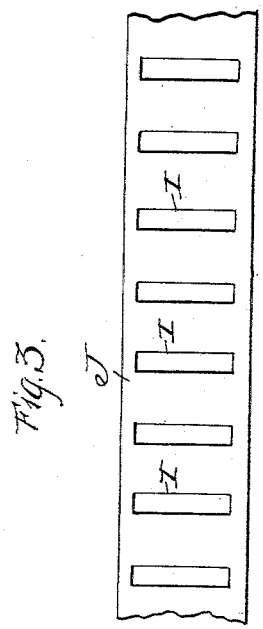

Figure 1 of the drawings is a side elevation of the machine with part of the line shaft and gear broken away and one of the shredders in section. Fig. 2 is a plan view of the machine. Fig. 3 shows a fragment of slotted belt J. Fig. 4 shows a fragment of the continuous cutter. Fig. 5 is a plan view of grooved roll and comb. Fig. 6 shows a fragment of the slotted belt G.

The invention relates to the economic reduction of cereals in the grain state, to a desirable form of food, and it has for its object to provide means for the production of such form of food, rapidly, and in large quantities, commensurate with the ordinary use of such an article as bread.

In carrying out this invention, I provide in bearings upon a suitable frame F, a series of reducers or shredders A, which are arranged in succession.

Each reducer or shredding device, consists preferably of a pair of rolls B, B, whereof one is grooved. The grooves of the roll extend circumferentially around it, and are of small or fine character, and usually V-shaped in sectional form, the bottom of the groove having however some breadth. A groove having a width of one fiftieth of an inch, and a depth of one fiftieth of an inch serves an excellent purpose, especially in the reduction of wheat. The grooves are arranged in series around the cylindrical surface of the roll, and the intervals of the cylindrical surface between the grooves may be about one thirtieth of an inch.

The back roll of the pair or set is smooth and its cylindrical surface is in exact and neat contact with that of the grooved roll. The rolls are geared together to run in contact as indicated at C, and all the sets of the series are rotated at a uniform rate of speed. For this purpose a line shaft D may be provided with suitable gearing engaging the roll gear. Each set of reducing rolls is provided with a discharging scraper or comb E, which is secured to the frame. This scraper or comb has teeth which are complementary in their contour to the grooves of the roll, and engage said grooves to discharge the contents thereof, as brought around in said grooves. Over each set of rolls is a hopper H, into which the grain, having been boiled and sufficiently dried for the proper action of the reducing rolls, is placed.

When the machine is in operation, each set of rolls discharges the grain in the form of continuous threads or shreds of fine or small cross-section. In order to take up these different discharges of the reducers, a continuous receiver belt or carrier G is provided having suitable pulleys or rollers K, at its ends, and proper guides of the framing to keep its upper or receiving portion level. This belt, being run at a suitable rate of speed takes the discharged threads or shreds of the reducers along with it, disposing the layers successively upon each other to a thickness suitable for baking, this thickness being governed by the number of reducers employed. In order to form and subdivide the material thus built up on the belt and carried along thereby into sections for biscuit or loaves, a continuous cutter L is provided. This cutter is preferably one which moves at the same rate of speed as the belt, and may be a wheel having radially projecting blades N, which extend transversely. The distance between the blades determines the breadth of the biscuit-sections. A continuous band J, extends at the height of the proposed biscuit above the carrier belt, and parallel therewith. This band J is run at the same rate of speed as the belt G, and is provided with transverse slots I, which are engaged by the blades of the cutter as the latter revolves, said blades projecting through said slots into the material on the belt G, and subdividing the same into sections. This band J serves as a clearer for the cutter blades, keeping them free from adherence of the shredded or threaded product.

The cutter should be run by means of a sprocket chain from the belt pulley of the carrier or from some shaft in gear therewith, at the same rate of speed as the carrier belt. By means of this cutter the biscuits or loaves can be nearly cut through or separated so as to leave a thin or web-like attachment between them at their lower portions, such attachment causing them to hold together sufficiently for leading in delivering them to an oven-belt on which they may be baked.

If it is desired to separate the biscuits or loaves entirely the pressure wheel P, which runs under the belt G immediately below the cutter wheel may be provided in order to form an under cutter with short blades V, adapted to protrude in turn through transverse slots Z, which may be formed in the belt G for this purpose.

The threads or shreds of material are very delicate and tender, and, owing to their nature and their roughened or somewhat jagged exterior, adhere to each other readily so as to give considerable stability to the biscuit formation, but in order to prevent them from adhering to the cutter blades or cutter, the clearing belt or band J is provided as hereinbefore described.

S, S designate a pair of cutter disks situated back of the last comb E. The purpose of these disks is to trim the lateral edges of the layers of product on the belt G before it passes to the cutter L.

Any suitable form of gearing may be employed for giving the cutter L and clearer J the proper movements, a suitable arrangement for the purpose being indicated at the right of Figs. 1 and 2.

Having described this invention, what I claim, and desire to secure by Letters Patent, is—

1. The combination of a series of sets of reducing rolls, their discharging combs, a continuous receiver belt underneath said rolls, a rotary cutter journaled over said belt beyond the last set of said rolls, and gear for rotating said cutter at the same rate of speed as said belt, substantially as specified.

2. The combination of a series of sets of reducing rolls, their discharging combs, a continuous receiver belt underneath said rolls, a rotary cutter journaled over said belt beyond the last set of said rolls, a slotted endless clearer belt for said cutter, and gear for rotating said cutter and clearer belt at the same rate of speed as the receiving belt, substantially as specified.

3. The combination with the reducing rolls, and a continuous receiver belt, of a moving cutter, and an endless, traveling, slotted clearer belt operating in connection with said cutter, substantially as specified.

4. The combination with reducing rolls and a continuous receiver band, of an endless moving cutter having a series of blades and a slotted endless clearer belt, substantially as specified.

5. The combination with reducing rolls, and a slotted continuous receiver band, of an endless moving cutter, a slotted clearer belt, and a moving under cutter, having its blades working through the slots of the receiver band, substantially as specified.

In testimony whereof I affix my signature in the presence of two witnesses.

HENRY D. PERKY.

Witnesses:
JOHN S. PERKY,
J. M. STANLEY.